United States Patent
Bosma et al.

(10) Patent No.: US 9,072,272 B2
(45) Date of Patent: Jul. 7, 2015

(54) INDEPENDENT CLEANING OF INTERFACES BETWEEN SEPARABLE FLUID SYSTEMS

(75) Inventors: Epke Bosma, Holo (SE); Martin Sjolund, Grodinge (SE); Staffan Persson, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 925 days.

(21) Appl. No.: 13/201,920

(22) PCT Filed: Feb. 4, 2010

(86) PCT No.: PCT/EP2010/051379
§ 371 (c)(1),
(2), (4) Date: Aug. 17, 2011

(87) PCT Pub. No.: WO2010/094577
PCT Pub. Date: Aug. 26, 2010

(65) Prior Publication Data
US 2011/0297188 A1    Dec. 8, 2011

(30) Foreign Application Priority Data
Feb. 19, 2009  (SE) ........................... 0950088

(51) Int. Cl.
B08B 3/04    (2006.01)
B08B 9/00    (2006.01)
(Continued)

(52) U.S. Cl.
CPC ........................... *A01J 7/022* (2013.01)

(58) Field of Classification Search
CPC .............. B08B 3/04; B08B 9/00; B08B 9/02; A01J 7/02; A01J 7/022
USPC ............... 134/95.1, 169 C, 169 R, 98.6, 98.1, 134/166 R
See application file for complete search history.

(56) References Cited

U.S. PATENT DOCUMENTS

| | | | |
|---|---|---|---|
| 5,762,020 A | 6/1998 | Van Der Lely | |
| 6,852,172 B1 * | 2/2005 | Lidman | 134/21 |

(Continued)

FOREIGN PATENT DOCUMENTS

| | | |
|---|---|---|
| BY | 2181 U | 9/2005 |
| EA | 003016 B1 | 12/2002 |

(Continued)

OTHER PUBLICATIONS

International Search Report, dated Feb. 22, 2011, from corresponding PCT application.

(Continued)

*Primary Examiner* — Saeed T Chaudhry
(74) *Attorney, Agent, or Firm* — Young & Thompson

(57) ABSTRACT

A milking installation includes first and second fluid systems (S1; S2) and a coupling arrangement for connecting and disconnecting the first fluid system (S1) to and from the second fluid system (S2). In a connected state, the first and second fluid systems (S1, S2) are in fluid communication with one another, and in a disconnected state the first and second fluid systems (S1, S2) are not in fluid communication with one another. The coupling arrangement includes a common cavity (CC) configured to be alternately included in the first fluid system (S1) or in the second fluid system (S2) for through passage of fluid while the first and second fluid systems (S1, S2) are disconnected from one another. The first fluid system (S1) also has a by-pass arrangement configured to allow fluid in the first fluid system (S1) to circulate independently from the passage of fluid through the common cavity (CC) when the common cavity (CC) is included in the second fluid system (S2).

13 Claims, 6 Drawing Sheets

(51) Int. Cl.
  *B08B 9/02* (2006.01)
  *A01J 7/02* (2006.01)

(56) References Cited

U.S. PATENT DOCUMENTS

| 6,860,283 | B1 | 3/2005 | Finkeldei et al. |
| 2008/0066803 | A1 | 3/2008 | Wu et al. |

FOREIGN PATENT DOCUMENTS

| EP | 0 626 130 | A1 | 11/1994 |
| EP | 0626130 | * | 11/1994 |
| EP | 0 626 129 | A1 | 2/1999 |
| EP | 1 466 521 | A2 | 10/2004 |
| KZ | 13990 | A | 2/2004 |
| RU | 2 220 566 | C2 | 1/2004 |
| SU | 878383 | A | 11/1981 |
| WO | 01/19175 | A1 | 3/2001 |
| WO | 2008/095552 | A1 | 8/2008 |
| WO | 2008/097160 | A1 | 8/2008 |

OTHER PUBLICATIONS

International-Type Search Report, dated Aug. 17, 2009, from corresponding PCT application.
Supplementary International Search Report, dated Jun. 16, 2011, from corresponding PCT application.

* cited by examiner

INDEPENDENT CLEANING OF INTERFACES BETWEEN SEPARABLE FLUID SYSTEMS

THE BACKGROUND OF THE INVENTION AND PRIOR ART

The present invention relates generally to cleaning of automatic milking equipment. More particularly the invention relates to a milking installation and a cleaning method. The invention also pertains to a computer program.

DESCRIPTION OF THE RELATED ART

Automatic milking solutions are becoming increasingly efficient and sophisticated. Today, there is also a strong demand for flexible and animal-friendly milk production. For example, so-called milking robots have been introduced, which enable animals to autonomously decide when they are to be milked. In similarity with other types of milking plants, also these machines require cleaning to maintain a satisfying hygiene standard and to meet various regulatory requirements. Since, in contrast to traditional milking plants, the milking robots may be operated essentially at any time during the day; there are no natural specific occasions when it is appropriate to clean the milk line system of a milking robot. Moreover, taking the milking robot out of operation to manually clean its milk line system is a highly inefficient strategy. Instead, an entirely automatic cleaning procedure is desired. This approach is also advantageous from an animal-health point-of-view. Namely, one or more animals using the milking robot may undergo medical treatment, and therefore their milk cannot be mixed with the milk from the healthy animals. Based on the respective animal's identity, a computer system associated with the milking robot automatically directs any extracted milk that, for various reasons, is unusable (e.g. because it may contain antibiotics, or other undesired constituents) to a dedicated container. Additionally, after having extracted the unusable milk, the computer system orders cleaning of the milking robot's milk line system. Naturally, it is important that the detergents used during this cleaning are not mixed into the milk. Therefore, it is desirable to enable efficient on-demand separation between different parts of a milking installation, such as between the milk line system and the milk tank.

The published international patent application WO 2008/095552 describes a solution for monitoring milking plant valve means, wherein an amount of leakage through the valve means during cleaning can be determined. The published international patent application WO 2008/097160 discloses a general solution for eliminating the risk of leakage from one fluid system to another, which solution may be implemented in a milking installation in order to avoid detergent contamination of the milk in connection with cleaning. The above solutions are useful to achieve adequate separation between a milk side and a non-milk side of a milking plant. Moreover, it is important that the valves of the interfaces separating various subsystems in a milking plane are adequately cleaned. Therefore, said interfaces must be accessible for through passage of cleaning fluid. Also this problem has been addressed in the prior-art.

However, here, the cleaning procedures for the separable systems must be coordinated, such that either both systems are cleaned simultaneously with a common detergent, or one system is cleaned after that the cleaning of the other system has been completed.

SUMMARY OF THE INVENTION

The object of the present invention is therefore to solve the above problem and thus offer an efficient, reliable and flexible solution for cleaning the interfaces between any separable fluid systems of a milking installation. According to one aspect of the invention, the object is achieved by the initially described milking installation, wherein the first fluid system includes a by-pass arrangement configured to allow fluid in the first fluid system to circulate independently from the passage of fluid through the common cavity when the common cavity is included in the second fluid system This design is advantageous because it enables efficient cleaning of all pipes, cavities and valves of the milking installation including the valve surfaces of the interfaces between the separable fluid systems. Furthermore, the by-pass arrangement renders it possible to operate the first and second fluid systems independently from one another, such that for example the first fluid system is cleaned while milk is being emptied from the second fluid system.

According to a preferred embodiment of this aspect of the invention, the first fluid system includes a drain outlet configured to enable output of fluid from the first fluid system. Preferably, this drain outlet is used in connection with replacing fluids in the first fluid system, e.g. when introducing a first cleaning fluid after milking, or when introducing a second cleaning fluid after a first ditto. Hence, the procedure may involve the consecutive steps of: opening the drain outlet, discharging an existing fluid in the first fluid system via the drain outlet, closing the drain outlet, and passing cleaning fluid through the first fluid system. Thereby, the risk for undesired mixing of different fluids in the first fluid system can be made very small.

According to another preferred embodiment of this aspect of the invention, at least one valve interface of the common cavity's valve interfaces is associated with a shut-off arrangement, which when said valve interface is in a closed state is configured to trap a working fluid in a barrier cavity adjoining said valve interface. The trapped working fluid has a pressure level exceeding both a first pressure level in the first fluid system and a second pressure level in the second fluid system. Consequently, when the shut-off arrangement is closed, the risk of leakage between the first and second fluid systems is eliminated.

According to yet another preferred embodiment of this aspect of the invention, the installation includes at least one milk extraction station and a milk tank. Each milk extraction station is here configured to automatically withdraw milk from at least one animal, and each milk extraction station is included in the first fluid system. The milk tank is configured to receive extracted milk from the at least one milk extraction station. The milk tank is further included in the second fluid system. Hence, the milk extraction stations and the milk tank may be efficiently separated from one another. It is also rendered possible to clean all sealing surfaces between these fluid systems in a reliable and straightforward manner.

According to a further preferred embodiment of this aspect of the invention, each sealing surface of the common cavity's valve interfaces is accessible for through passage of fluid via at least one of the first and second fluid systems while the first and second fluid systems are disconnected from one another. This is advantageous because thereby the common cavity and its valve interfaces may be cleaned adequately in a straightforward manner.

According to another aspect of the invention, the object is achieved by the initially described method, wherein the first fluid system includes a by-pass arrangement configured to allow fluid in the first fluid system to circulate independently from the passage of fluid through the common cavity when the common cavity is included in the second fluid system, and the method involves determining if the common cavity is available for forwarding cleaning fluid through the first fluid system via the common cavity. If it is found that the common cavity is available for such transport of cleaning fluid, the common cavity is included in the first fluid system, and cleaning fluid is forwarded through the first fluid system via the common cavity. Otherwise, however, (i.e. if common cavity is unavailable for transport of cleaning fluid) the method instead involves forwarding cleaning fluid through the first fluid system via the by-pass arrangement. The advantages of this method, as well as the preferred embodiments thereof, are apparent from the discussion hereinabove with reference to the proposed milking installation.

According to a further aspect of the invention, the object is achieved by a computer program, which is loadable into the internal memory of a computer, and includes software for controlling the above proposed method when the program is run on a computer.

According to another aspect of the invention, the object is achieved by a computer readable medium, having a program recorded thereon, where the program is to control a computer to perform the above-proposed method.

Further advantages, advantageous features and applications of the present invention will be apparent from the following description.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1A:
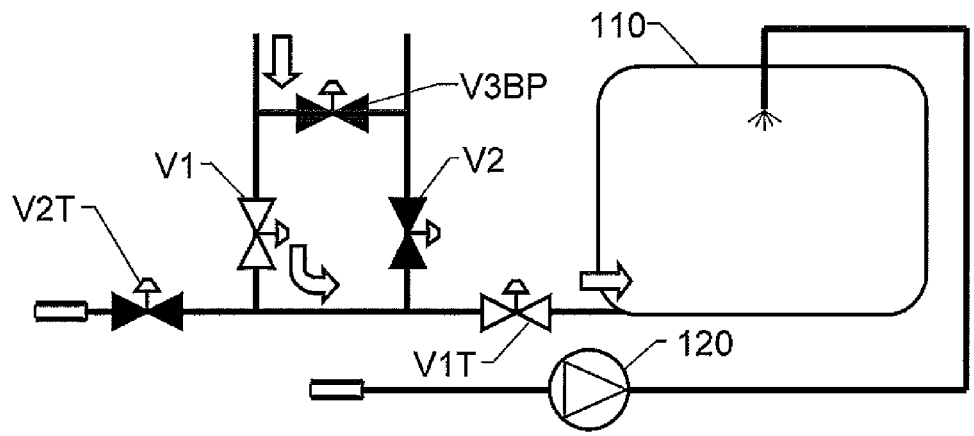
FIGS. 1a-b show schematic views over an interface between a milk extraction station and a milk tank according to a first embodiment of the invention during extraction of milk and emptying of the tank respectively.

FIG. 1a shows a schematic view over an interface between a milk extraction station (not shown) and a milk tank 110 according to a first embodiment of the invention. Here, the milk extraction station withdraws milk from an animal and via a milk line system forwards the milk into the milk tank 110. To this aim, a first milk line valve means V1 and a first tank valve means V1T are open. To avoid recirculation of the milk into the milk line system, a second milk line valve means V2 is closed. A valve means V3BP of a by-pass arrangement is likewise closed. Further, a second tank valve means V2T towards an external connection is also closed, such that the milk is forced into the milk tank 110.

Figure 1B:
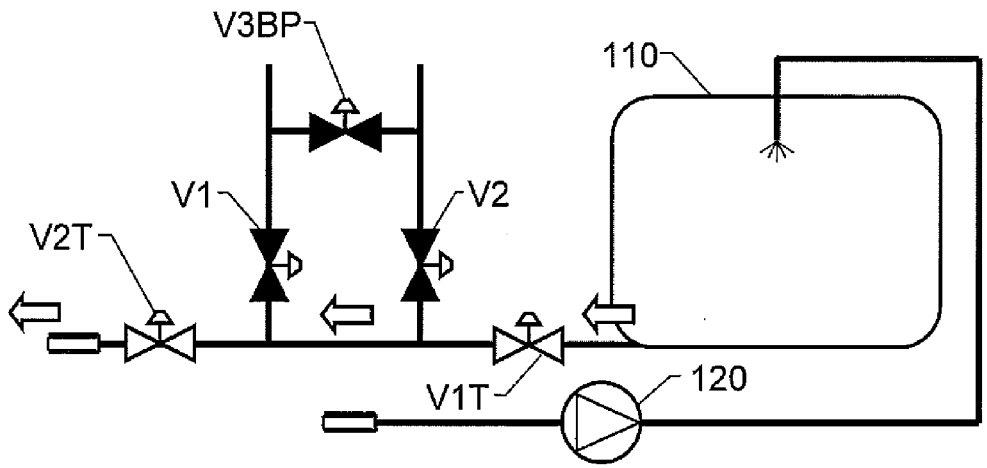

FIG. 1b shows the interface of FIG. 1a during emptying of the milk tank 110. Now, the first and second milk line valve means V1 and V2 respectively are closed, and both the first and second tank valve means V1T and V2T are open. Consequently, the milk from the tank 110 exits through the external connection without risking to be fed back into the milk line system. The by-pass valve means V3BP may either be open or closed (as shown in the figure).

FIG. 1c again shows a schematic view over the interface in FIGS. 1a and 1b. As can be seen, the valve means V1, V2, V1T and V2T represent a coupling arrangement between the milk extraction station and the milk tank 110. Within this coupling arrangement there is common cavity CC (represented by the conduits between said valve means), which may be included either in a first fluid system S1 containing the milk line system, or in the second fluid system S2 containing the milk tank 110 for through passage of fluid while the first and second fluid systems S1 and S2 are disconnected from one another.

Figure 1C:
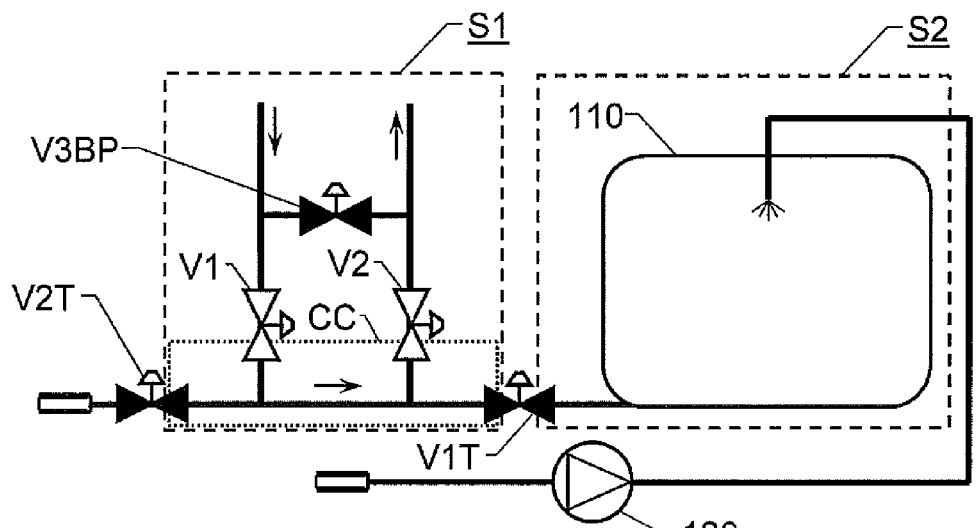
FIG. 1c shows a schematic view over the interface in FIGS. 1a-b in a disconnected state, wherein fluid in a first fluid system is passed through a common cavity of a coupling arrangement between the milk extraction station and the milk tank.

FIG. 1c illustrates a first disconnected state, wherein the first fluid system S1, which includes the milk line system, is separated from the second fluid system S2 including the milk tank 110. The first and second fluid systems S1 and S2 are thus not in fluid communication with one another. In this disconnected state, the by-pass valve means V3BP is closed, so that fluid in the first fluid system S1 passes through the common cavity CC of the coupling arrangement. Typically, the fluid being forwarded in the first fluid system S1 is a detergent that cleans the system S1, i.e. here the milk line system. Moreover, during such cleaning of the first fluid system S1, the second fluid system normally contains milk. It is therefore important that the first tank valve means V1T is properly closed. To eliminate the risk of detergent leakage into the milk tank 110, the first tank valve means is V1T preferably designed as described in the above-mentioned document WO 2008/097160. The second tank valve means V2T may either be closed (as shown in FIG. 1c), or be opened and thus function as a drain valve. In any case, the sealing surfaces of the first and second milk line valve means V1 and V2 are accessible by the first fluid passing through the first fluid system S1. At the same time, the first and second fluid systems S1 and S2 are disconnected from one another. Thus, the sealing surfaces of the first and second milk line valve means V1 and V2 can be cleaned in connection with cleaning of the milk line system, and during this process the milk tank 110 may contain milk.

Figure 1D:
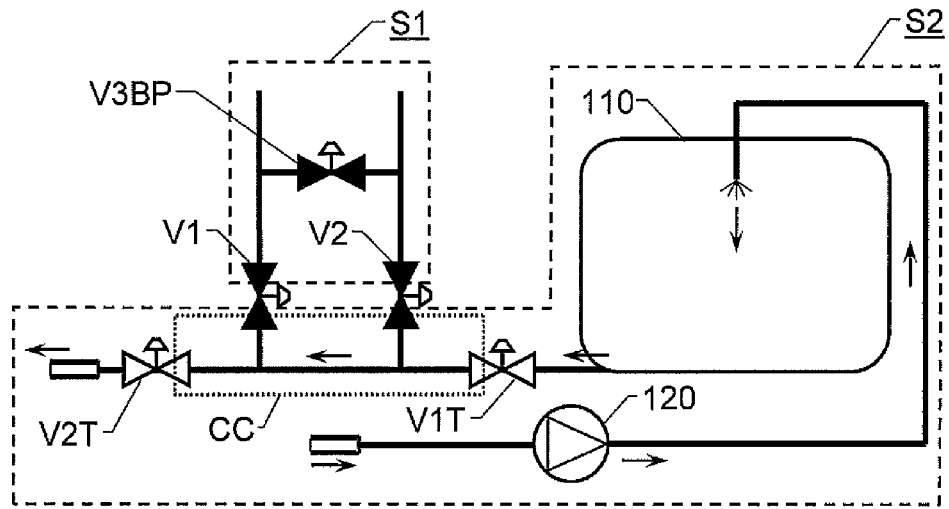
FIG. 1d shows a schematic view over the interface in FIGS. 1a-b in a disconnected state, wherein fluid in a second fluid system is passed through the common cavity.

FIG. 1d shows a schematic view over the interface in FIGS. 1a and 1b in a second disconnected state, wherein fluid in the second fluid system S2 is passed through the common cavity CC. In this state, both the first and second milk line valve means V1 and V2 are closed. Thereby, the milk line system, (here included in S1) is disconnected from the milk tank 110, which is included in the second fluid system S2. In other words, the first and second fluid systems S1 and S2 are not fluid communication with one another. Analogous to the case discussed above with reference to FIG. 1b, the by-pass valve means V3BP may either be open or closed (as shown in the figure).

In any case, the first and second tank valve means V1T and V2T are open. Moreover, a pump means 120 is connected to the milk tank 110 via a separate conduit. This enables the forwarding of the fluid in the second fluid system S2 from the milk tank 110, through the common cavity CC and out from the milking installation via the external connection. Preferably, especially if the fluid contains detergents, the external connection is connected to an upstream side of the pump means 120, e.g. via a cleaning fluid vessel. Thereby, the fluid can be circulated in the second fluid system S2. This will be discussed further below with reference to FIG. 1e.

Figure 1E:
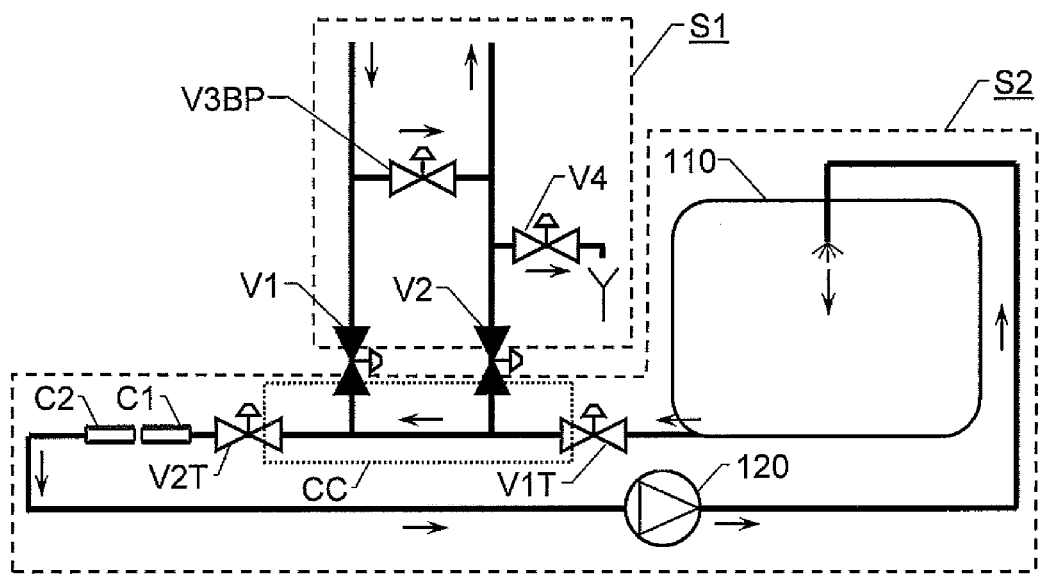
FIG. 1e shows a schematic view over the interface between a milk extraction station and a milk tank according to an embodiment of the invention, wherein the coupling arrangement is in the disconnected state, fluid in the second fluid system is passed through the common cavity and fluid is also passed through the first fluid system.

FIG. 1e shows a schematic view over the interface between a milk extraction station and a milk tank according to another embodiment of the invention. Analogous to the above, the coupling arrangement is in a disconnected state, wherein the first and second fluid systems S1 and S2 are not in fluid communication with one another. Here, the first fluid system's S1 by-pass valve means V3BP over the common cavity CC is open while the first and second milk line valve means V1 and V2 are closed. Thus, the fluid in the first fluid system S1 may circulate independently from the passage of fluid through the common cavity CC when the common cavity CC is included in the second fluid system S2. This is advantageous because thereby both systems S1 and S2 may be cleaned simultaneously (or in overlapping intervals), and diverse detergents can be used during these processes without interfering with one another. For example, a basic detergent may be circulated in one system while an acid-containing detergent is used in the other system.

In the set-up illustrated in FIG. 1e, the first and second milk line valve means V1 and V2 are closed, and the same time, the first and second tank valve means V1T and V2T are open. As a result, fluid in the second fluid system S2 can pass through the common cavity CC. However, since the by-pass valve means V3BP also is open, fluid can likewise be passed through the first fluid system S1. This means that the sealing surfaces of the valve interfaces V1T and V2T of the common cavity CC are accessible for cleaning by means of the second fluid passing through the common cavity CC. The remaining sealing surfaces of the common cavity CC, i.e. those provided by the valve means V1 and V2, are accessible for cleaning by means of the fluid in the first fluid system S1 when these valves are open, and the valve interfaces V1T and V2T are closed.

As indicated above, to accomplish adequate cleaning of the system, it is generally desirable to pass cleaning fluid repeatedly through the system, i.e. that detergents be circulated. In the second fluid system S2 of FIG. 1e, this means that the external connection C1 is connected a connector C2, which in turn, is connected via a conduit to the upstream side of the pump means 120, either directly (as shown in the figure), or via a cleaning fluid vessel (see 430 in FIG. 4). Namely, thereby, we attain a closed circuit that includes the common cavity CC. Preferably, during cleaning, a similar circuit is closed also in the first fluid system S1. Here, a pump means (see 415 in FIG. 4) which is intended for pumping milk may be used for circulating the detergents.

The milk line system, here the first fluid system S1, is normally cleaned 2-3 times per day (i.e. at 8 or 12 hour intervals), and each cleaning usually takes 15-30 minutes. The milk tank 110 and its associated conduit system, here the second fluid system S2, is normally cleaned at 48 or 72 hour intervals, and each cleaning typically has a duration of 1 hour. Thus, although the risk is relatively low, there is a possibility that the cleaning of the first and second fluid systems S1 and S2 overlap in time. Should this happen, the sealing interfaces of the valve means V1 and V2 will not be accessible for any cleaning fluids. However, given the above time frames, the maximum delay until the next cleaning of these sealing interfaces is 12 hours.

According to the embodiment of the invention illustrated in FIG. 1e, the first fluid system S1 includes a drain outlet V4, which is configured to allow the output of fluid from the first fluid system S1. Such an outlet is advantageous because it allows a convenient discharge of fluid from the first fluid system S1, for instance in connection with cleaning of the first fluid system S1. It is generally preferable to use the drain outlet V4 whenever one fluid in the first fluid system is to be replaced with another fluid. Thus, when, after having completed the milking of an animal and the milk line system shall be cleaned, the drain outlet V4 can be opened to discharge any remaining milk. Then, the drain outlet V4 is closed and the first cleaning fluid is introduced into the first fluid system S1 for circulation therein. Subsequently, the drain outlet V4 may be opened again, such that the first cleaning fluid is discharged. Thereafter, the drain outlet V4 is closed, and a second cleaning fluid is introduced into the first fluid system S1 for circulation therein. Naturally, before milk is reintroduced into the first fluid system, the second cleaning fluid is likewise discharged via the drain outlet V4. Consequently, the drain outlet V4 renders it possible to minimize the risk of undesired mixing of different fluids in the first fluid system S1.

Figure 2A:
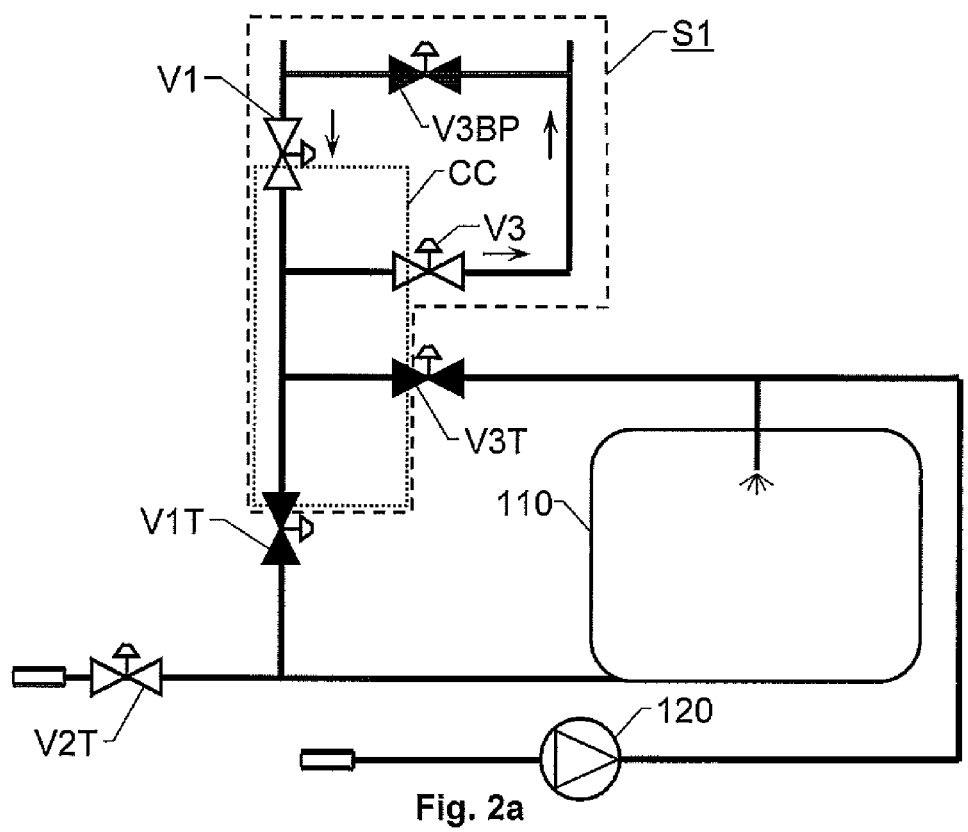
FIGS. 2a-b show schematic views over an interface between a milk extraction station and a milk tank according to a second embodiment of the invention during cleaning of a milk line system to the milk extraction station and cleaning of the milk tank respectively.

FIG. 2a shows a schematic view over an interface between a milk extraction station and a milk tank 110 according to a second embodiment of the invention. Here, tank valve means V1T and V3T respectively and milk line valve means V1 and V3 have interfaces towards the common cavity CC. Another tank valve means V2T is also included to provide external access to the milk tank 110.

FIG. 2a illustrates a situation when the first and second fluid systems S1 and S2 are not in fluid communication with one another, and fluid is passed through the first fluid system S1 (e.g. for cleaning purposes). To this aim, the tank valve means V1T and V3T are closed and the milk line valve means V1 and V3 are open. Consequently, the sealing surfaces of the latter valve means of the common cavity CC is accessible for through passage of fluid in the first fluid system S1. At the same time, milk can be taken out from the milk tank 110 via the tank valve means V2T.

To ensure proper cleaning of the by-pass arrangement and the valve means V3BP thereof, said valve means is preferably controlled to be opened intermittently during cleaning of the first fluid system S1 via the common cavity CC. Hence, cleaning fluid is forwarded through the first fluid system S1 via the common cavity CC and via the by-pass arrangement during a common cleaning operation.

Furthermore, if cleaning fluid is being forwarded through the first fluid system S1 via the common cavity CC, and during this process it is requested that the milk tank 110 be emptied (e.g. because a milk tank truck has arrived), the common cavity CC needs to be freed from the first fluid system S1, such that the common cavity CC instead can be included in the second fluid system S2. To this aim, it is preferable if the system is configured to automatically execute the following steps in response to command indicating that a milk conduit is to be attached to the tank valve means V2T: (i) opening of the by-pass valve means V3BP, (ii) closing of the milk line valve means V1 and V3, (iii) draining of the common cavity CC via the tank valve means V2T, and (iv) cleaning of the common cavity CC plus the tank valve means V2T before the tank valve means V1T is opened for transport of fluid.

Figure 2B:
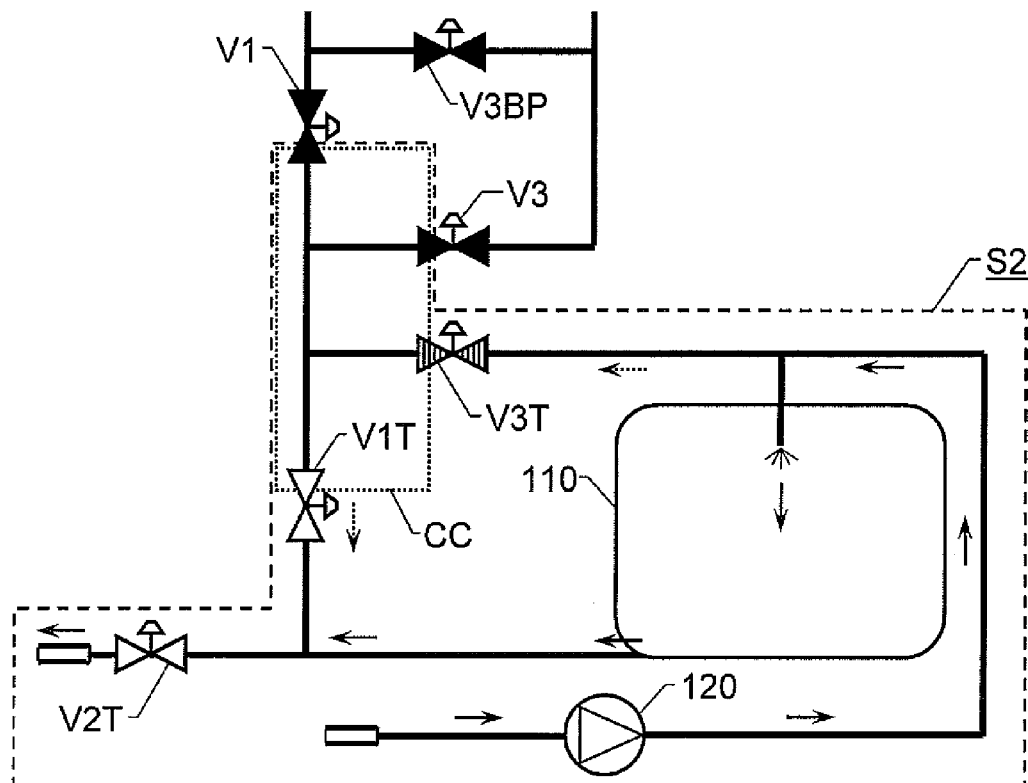

FIG. 2b shows the interface of FIG. 2a in a situation when the first and second fluid systems S1 and S2 are not in fluid communication with one another, and fluid is passed through the second fluid system S2 (e.g. in order to clean the milk tank 110 and the conduits and valves associated thereto). Here, the milk line valve means V1 and V3 are closed, and consequently the milk line system (included in the first fluid system S1) is separated from the common cavity CC. However, the tank valve means V1T and V2T are open. Moreover, the tank valve means V3T is pulsed (i.e. opened and closed intermittently). In the second fluid system S2 therefore, a first fraction of fluid passes into the milk tank 110, through the tank and out via the tank valve means V2T. Nevertheless, due to said pulsation of the tank valve means V3T a second fraction of the fluid in the second system S2 passes through the common cavity CC, and hence the sealing surface of the tank valve means V1T and V3T are accessible for the fluid in the second fluid system S2. Consequently, by controlling the valve means as described above all the sealing surfaces of the common cavity CC towards the first and second fluid systems S1 and S2 can be cleaned. Additionally, if, in the situation illustrated in FIG. 2b, the milk line system contains detergents, the by-pass valve means V3BP is preferably open, such that its sealing surfaces can be accessed by cleaning fluid passing through the by-pass conduit over the common cavity CC.

Figure 3A:
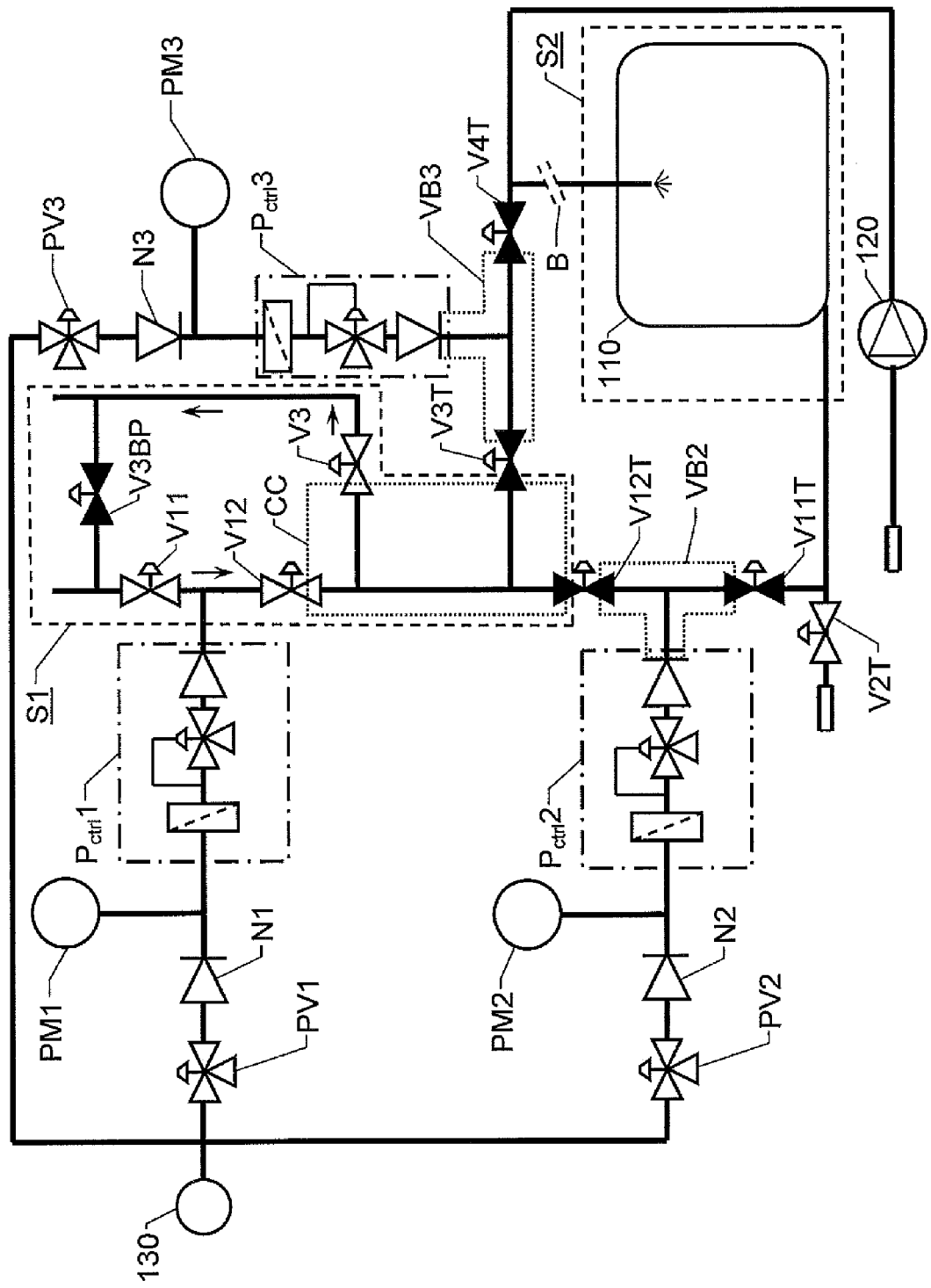
FIGS. 3a-b show schematic views over an interface between a milk extraction station and a milk tank according to a third embodiment of the invention during cleaning of the milk line system to the milk extraction station and cleaning of the milk tank respectively.

FIG. 3a shows a schematic view over an interface between a milk extraction station and a milk tank 110 according to a third embodiment of the invention in a situation analogous to that illustrated in FIG. 2a (i.e. when fluid is passed through the first fluid system S1). In addition to the components and units described above with reference to FIGS. 2a and 2b, the embodiment shown in FIG. 3a includes a respective shut-off arrangement associated with the valve interfaces V12, V12T and V3T towards the common cavity CC. When either of these valve interfaces is in a closed state, the shut-off arrangement is configured to trap a working fluid in a barrier cavity VB1, VB2 and VB3 respectively. The barrier cavity adjoins the valve interface in question (i.e. VB1 adjoins V12; VB2 adjoins V12T; and VB3 adjoins V3T), and the trapped working fluid has a pressure level exceeding both a first pressure level in the first fluid system S1 and a second pressure level in the second fluid system S2. To accomplish this, various pressure control elements are included. A fluid source 130 is arranged to supply the working fluid (e.g. in the form of sanitary air) to each shut-off arrangement. A first working fluid chain of the first shut-off arrangement may include a first pressure valve means PV1, a first non-return valve means N1, a first pressure meter PM1 and a first pressure control circuit $P_{ctrl}1$. Thereby, whenever the first shut-off arrangement is in a closed state, the first working fluid chain may ensure that a first barrier cavity VB1 (see FIG. 3b) between the valve means V12 and V11 attains an adequate pressure level relative to the pressure levels in the first and second fluid systems S1 and S2. Analogously, a second working fluid chain of the second shut-off arrangement may include a second pressure valve means PV2, a second non-return valve means N2, a second pressure meter PM2 and a second pressure control circuit $P_{ctrl}2$, and a third working fluid chain of the third shut-off arrangement may include a third pressure valve means PV3, a third non-return valve means N3, a third pressure meter PM3 and a third pressure control circuit $P_{ctrl}3$. Thus, whenever the second and/or third shut-off arrangement is in a closed state, the second barrier cavity VB2 between the valve means V11T and V12T attains an adequate pressure level and/or the third barrier cavity VB3 between the valve means V3T and V4T attains an adequate pressure level respectively relative to the pressure levels in the first and second fluid systems S1 and S2.

As an alternative to the third shut-off arrangement, the cleaning fluid connection to the milk tank 110 may be disconnected manually. This is illustrated with B in FIG. 3a.

FIG. 3a illustrates a situation when fluid is being passed through the first fluid system S1 (e.g. in order to clean this system). For that reason, milk line valve means V11, V12 and V3 are open and the first shut-off arrangement is in an open state. However, the second and third shut-off arrangements are both in a closed state, and the therefore the second and third barrier cavities VB2 and VB3 respectively hold an amount of pressurized working fluid.

Figure 3B:
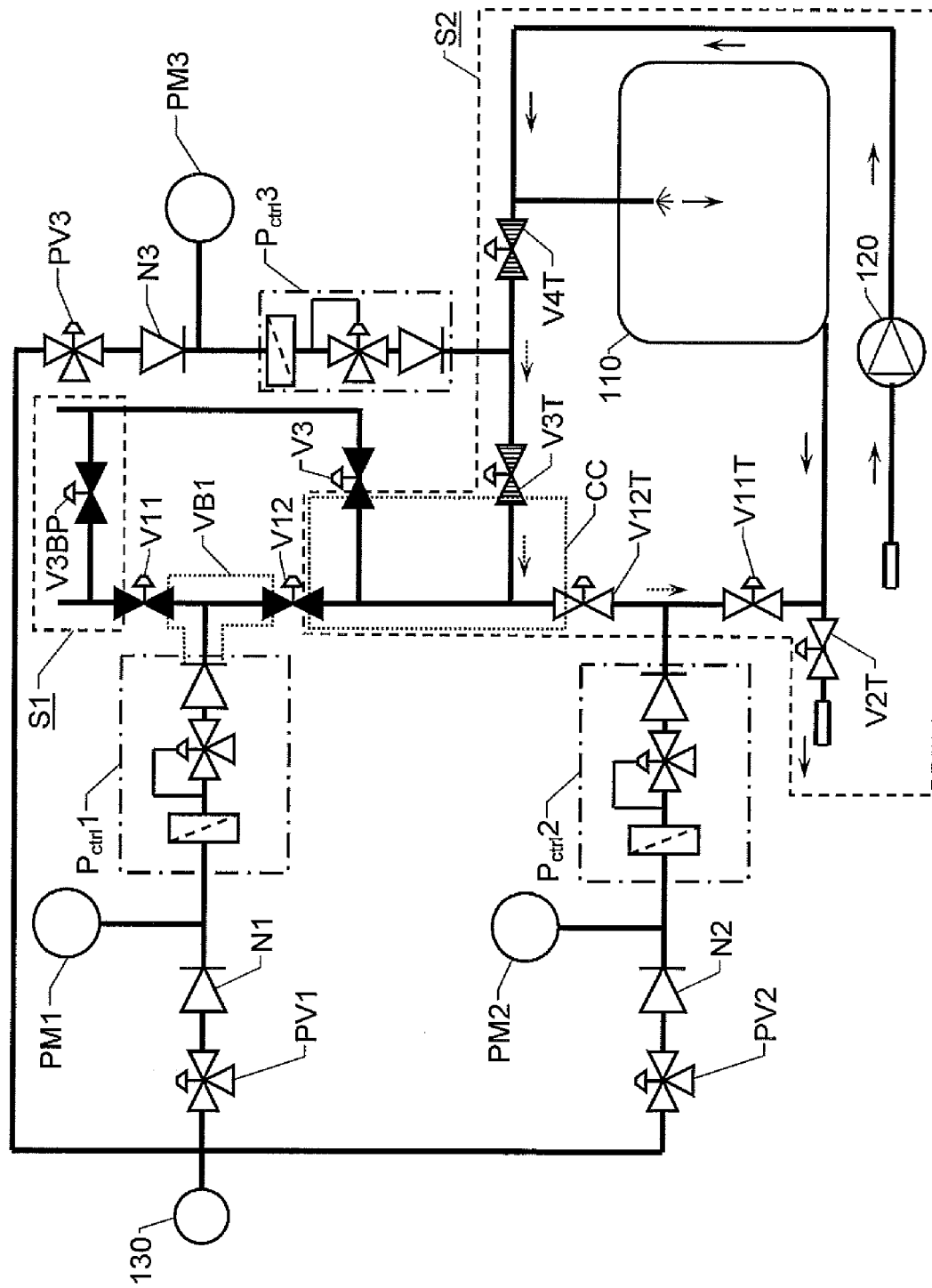

FIG. 3b illustrates a situation when instead fluid is being passed through the second fluid system S2 (i.e. analogous to the case illustrated in FIG. 2b). Here, the milk line valve means V11, V12 and V3 are closed, the tank valve means V12T, V11T and V2T are open, and the tank valve means V3T and V4T are pulsed. Consequently, the second shut-off arrangement is in an open state, and the first shut-off arrangement is in a closed state. Therefore the first barrier cavity VB1 holds an amount of pressurized working fluid.

Naturally, according to the invention, although only explicitly shown in FIG. 1e, a circuit for circulating fluid in the second fluid system may be formed in any one of the above-described embodiments. Similarly, fluid may be circulated through the first fluid system S1 in all embodiments of the invention. Moreover, the drain valve means V4 can be included in all embodiments of the invention.

Figure 4:
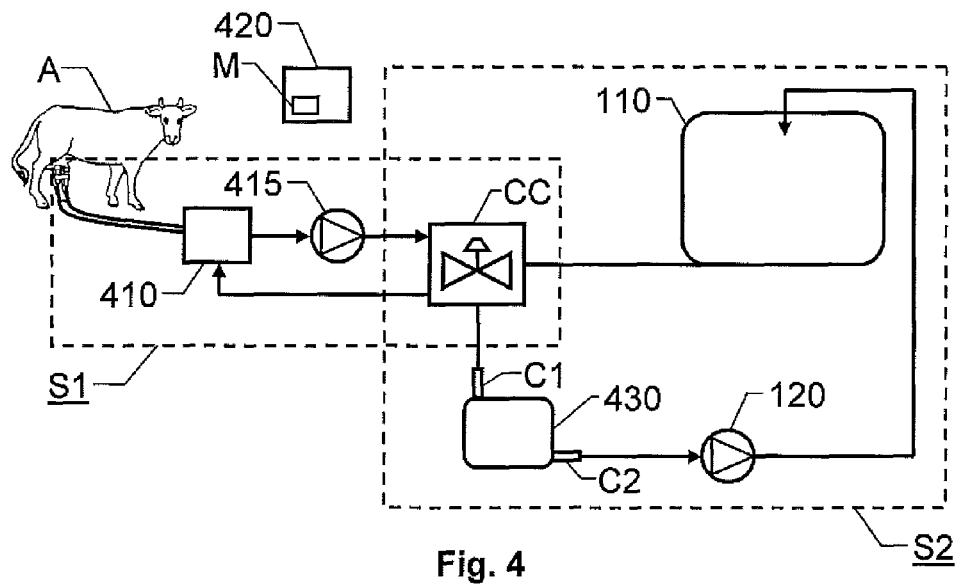
FIG. 4 illustrates a milking installation according to one embodiment of the invention.

FIG. 4 illustrates a general milking installation according to one embodiment of the invention. Here, the first fluid system S1 includes a milk extraction station 410, which is configured to automatically withdraw milk from an animal A. The milk extraction station 410 is connected to a common cavity CC via a milk pump means 415. The common cavity CC is further connected to a milk tank 110. Hence, milk may be extracted from the animal A and be fed into the milk tank 110. For reasons of simplicity, FIG. 4 only shows one animal A and one milk extraction station 410. However, according to the invention, a single milk extraction station 410 may simultaneously extract milk from two or more animals A, and two or more milk extraction stations 410 may be connected to a common milk tank 110.

In FIG. 4, the external connection C1 is connected to a cleaning fluid vessel 430, which in turn, is further coupled to the pump means 120 via a connector C2 and a conduit. Thus, the second fluid system S2 is configured to circulate a fluid. We therefore also assume that the coupling arrangement is in a disconnected state wherein the first and second fluid systems S1 and S2 are not in fluid communication with one another, and at least a fraction of the common cavity's CC sealing surfaces towards the first and second fluid systems S1 and S2 are accessible for through passage of fluid via second fluid system S2 (e.g. for cleaning purposes).

As mentioned above with reference to FIG. 1e, the first fluid system S1 may include a drain outlet V4. This outlet is preferably arranged at a lowest possible point of the first fluid system S1, such that fluids can be discharged efficiently from the first fluid system S1 there through. It is also advantageous to arrange a so-called air purge unit on the conduit between the milk pump means 415 and the common cavity CC. Thereby, any remaining milk in this conduit can be pushed into the milk tank 110 prior to introducing cleaning fluid into the first fluid system S1.

In order to allow an animal A to be milked while cleaning fluid is being circulated in the second fluid system S2, the milk extraction station 410 must be associated with a buffer tank (not shown). It is therefore preferable to include at least one buffer tank in the milking installation.

Furthermore, the milking installation preferably includes a control unit 420 configured to control the installation as described above. The control unit 420, in turn, includes, or is associated with, memory unit M comprising software for controlling the operation of the control unit. For example, the control unit 420 is thereby configured to operate a control system for the valve means V3BP, the tank valve means V2T and the milk line valve means V1 and V2, such that the common cavity CC can be included in the first or second fluid system S1 or S2 respectively depending on a current mode of operation; and that proper actions are taken in response to any commands indicating that a milk conduit is to be attached to the tank valve means V2T.

Figure 5:
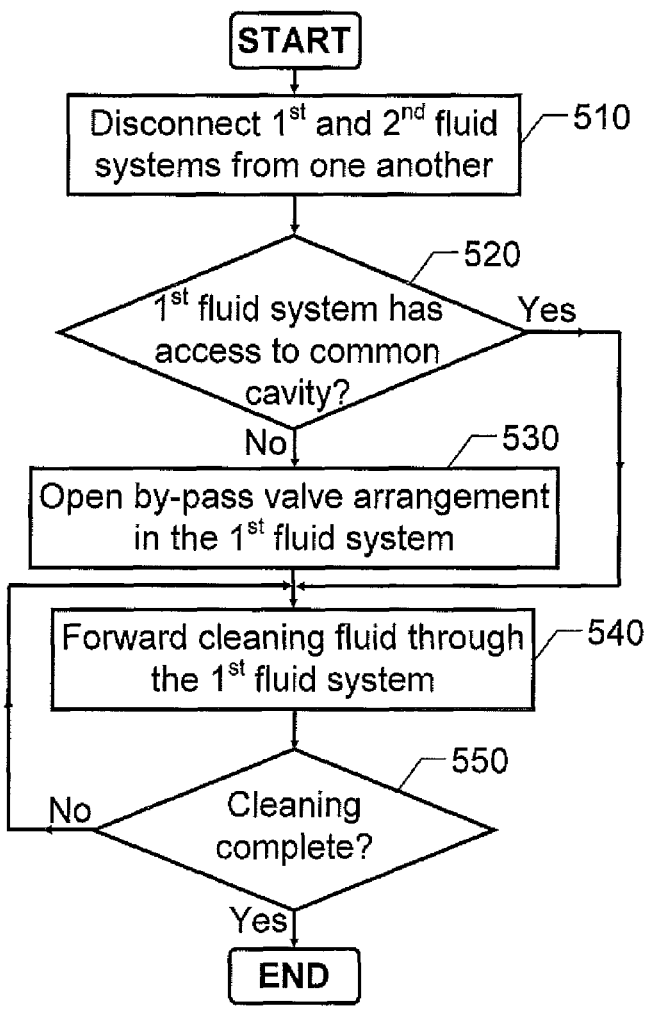
FIG. 5 illustrates, by means of a flow diagram, the general method according to the invention.

In order to sum up, we will now describe the general cleaning method according to the invention with reference to the flow diagram in FIG. 5.

The method presumes that the milking installation to be cleaned contains: at least one milk extraction station 410 configured to automatically withdraw milk from at least one animal A; a milk tank 110 configured to receive extracted milk from the at least one milk extraction station 410. Each of the at least one milk extraction station 410 is included in a first fluid system S1, and the milk tank 110 is included in a second fluid system S2. Further, a coupling arrangement is configured to connect and disconnect the first fluid system S1 to and from the second fluid system S2, wherein in a connected state the first and second fluid systems S1 and S2 are in fluid communication with one another and in a disconnected state the first and second fluid systems S1 and S2 are not in fluid communication with one another. The milking installation also has a common cavity CC configured to be alternately included in the first fluid system S1 or in the second fluid system S2 for through passage of fluid while the first and second fluid systems S1 and S2 are disconnected from one another.

A first step 510 disconnects the first and second fluid systems S1 and S2 from one another. Then, a step 520 checks if the first fluid system S1 has access to the common cavity CC, and If so, a step 540 follows. Otherwise, the procedure continues to a step 530, which opens a by-pass arrangement in the first fluid system S1 over the common cavity CC. Thereafter, step 540 forwards a cleaning fluid through the first fluid system S1. Subsequently, a step 550 checks if the cleaning is complete, and if so the procedure ends. Otherwise, the procedure loops back to step 540 for continued cleaning.

The common cavity CC has valve interfaces with sealing surfaces towards each of the first and second fluid systems S1 and S2, and while the first and second fluid systems S1 and S2 are disconnected from one another, the method preferably involves cleaning a first fraction of the sealing surfaces by forwarding cleaning fluid through the first fluid system S1, and cleaning a second fraction of the sealing surfaces by forwarding cleaning fluid through the second fluid system S2. The first and second fractions together include all of the common cavity's CC sealing surfaces towards the first and second fluid systems S1 and S2.

All of the process steps, as well as any sub-sequence of steps, described with reference to FIG. 5 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/ Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is advantageous in connection with cow milking, the invention is equally well adapted for implementation in milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or any other country.

The invention is not restricted to the described embodiments in the figures, but may be varied freely within the scope of the claims.

The invention claimed is:

1. A milking installation, comprising:
a first fluid system (S1) containing a milk line system including a milk extraction system, the milk line system configured to forward milk withdrawn from an animal by the milk extraction system, the first fluid system (S1) comprising a by-pass arrangement comprised of a by-pass valve (V3BP) disposed between first and second by-pass conduits;
a second fluid system (S2); and
a coupling arrangement for connecting and disconnecting the first fluid system (S1) to and from the second fluid system (S2), the coupling arrangement comprising a common cavity (CC), the common cavity (CC) comprises valve interfaces (V1, V2, V3, V12; V1T, V3T, V4T, V12T) with sealing surfaces located towards each of the first and second fluid systems (S1, S2), the first and second by-pass conduits of the by-pass arrangement being respectively connected with corresponding first and second ones of the valve interfaces, wherein,
in a connected state, the first and second fluid systems (S1, S2) are in fluid communication with one another, in a disconnected state, the first and second fluid systems (S1, S2) are not in fluid communication with one another, in the disconnected state, the common cavity (CC) is configured to be alternately included in i) the first fluid system (S1) for through passage of fluid through the first fluid system (S1) and the common cavity (CC) while the first and second fluid systems (S1, S2) are disconnected from one another, and ii) in the second fluid system (S2) for through passage of fluid through the second fluid system and the common cavity (CC) while the first and second fluid systems (S1, S2) are disconnected from one another, and the by-pass arrangement of the first fluid system (S1) is configured, in the disconnected state and when the common cavity (CC) is included in the second fluid system (S2), to allow the fluid in the first fluid system (S1) to circulate independently from the passage of the fluid through the common cavity (CC).

2. The milking installation according to claim 1, wherein the first fluid system (S1) further comprises a drain outlet (V4) configured to enable output of the fluid from the first fluid system (S1).

3. The milking installation according to claim 1, wherein the drain outlet (V4) is configured to enable output of fluid from the first fluid system (S1), and the controller causes
the drain outlet (V4) to be opened,
an existing fluid in the first fluid system (S1) to be discharged via the drain outlet (V4),
the drain outlet (V4) to be closed, and
the cleaning fluid to be passed through the first fluid system (S1).

4. The milking installation according to claim 1, wherein at least one valve interface (V12, V12T) of said valve interfaces is associated with a shut-off arrangement which, when said valve interface is in a closed state, is configured to trap a working fluid in a barrier cavity (VB1; VB2) adjoining said valve interface, the trapped working fluid having a pressure level exceeding both a first pressure level in the first fluid system (S1) and a second pressure level in the second fluid system (S2).

5. The milking installation according to claim 1, wherein the installation further comprises:
at least one milk extraction station (410) configured to automatically withdraw milk from at least one animal (A), each of the at least one milk extraction station (410) being included in the first fluid system (S1); and
a milk tank (110) configured to receive extracted milk from the at least one milk extraction station (410), the milk tank (110) being included in the second fluid system (S2).

6. The milking installation according to claim 1, wherein each sealing surface of the valve interfaces (V1, V2, V3, V12; V1T, V3T, V4T, V12T) of the common cavity (CC) is accessible for through passage of the fluid via at least one of the first and second fluid systems (S1, S2) when the first and second fluid systems (S1, S2) are disconnected from one another.

7. The milking installation according to claim 1, further comprising:

a controller that determines whether the common cavity (CC) of the coupling arrangement of the milking installation is available for forwarding cleaning fluid through the first fluid system (S1) via the common cavity (CC), the controller causing
the common cavity (CC) to be included in the first fluid system (S1), and forwarding the cleaning fluid through the first fluid system (S1) via the common cavity (CC) when the common cavity (CC) is determined to be available for forwarding the cleaning fluid through the first fluid system (S1) via the common cavity (CC), and
forwarding the cleaning fluid through the first fluid system (S1) via the by-pass arrangement when the common cavity (CC) is determined not to be available for forwarding the cleaning fluid through the first fluid system (S1) via the common cavity (CC).

8. The milking installation according to claim 1, wherein the controller, during a common cleaning operation, causes the cleaning fluid to be forwarded through the first fluid system (S1) via the common cavity (CC) and via the by-pass arrangement.

9. The milking installation according to claim 1, wherein when the common cavity (CC) is determined to be available for forwarding the cleaning fluid through the first fluid system (S1) via the common cavity (CC), the controller causes the cleaning fluid to be forwarded through the first fluid system (S1) a) via the common cavity (CC) and b) via the by-pass arrangement.

10. The milking installation according to claim 1,
wherein the controller causes the cleaning fluid to be forwarded through the first fluid system (S1) via the by-pass arrangement, and when the common cavity (CC) is included in the second fluid system (S2), causes the fluid to be forwarded through the second fluid system (S2) via the common cavity (CC).

11. The milking installation according to claim 1, wherein the controller causes the cleaning fluid to be forwarded through a first of the first and second fluid systems (S1, S2), while a second of the first and second fluid systems (S1, S2) contains milk.

12. The milking installation according to claim 1, wherein, while the first and second fluid systems (S1, S2) are disconnected from one another, the controller causes
a first fraction of the sealing surfaces to be cleaned by forwarding cleaning fluid through the first fluid system (S1), and
a second fraction of the sealing surfaces to be cleaned by forwarding cleaning fluid through the second fluid system (S2),
the first and second fractions together including all of the common cavity's (CC) sealing surfaces towards the first and second fluid systems (S1, S2).

13. The milking installation according to claim 1, wherein before the cleaning fluid is forwarded, milk is evacuated from the first and second fluid systems (S1; S2) into which the cleaning fluid is to be introduced.

* * * * *